United States Patent
Melano

(10) Patent No.: US 7,316,104 B2
(45) Date of Patent: Jan. 8, 2008

(54) ARRANGEMENT FOR REDUCING SOYBEAN LOSSES IN SOYBEAN HEADERS

(75) Inventor: Ariel Gustavo Melano, Dean Funes 125, Pozo del Molle, Departamento Rio Segundo, Cordoba (AR)

(73) Assignee: Ariel Gustavo Melano (AR)

( * ) Notice: Subject to any disclaimer, the term of this patent is extended or adjusted under 35 U.S.C. 154(b) by 0 days.

(21) Appl. No.: 11/255,558

(22) Filed: Oct. 21, 2005

(65) Prior Publication Data

US 2006/0117731 A1    Jun. 8, 2006

(30) Foreign Application Priority Data

Oct. 21, 2004   (AR) ............................. P040103805

(51) Int. Cl.
*A01D 34/18* (2006.01)
(52) U.S. Cl. .................. 56/298; 56/307; 56/327.1; 56/119; 56/14.3
(58) Field of Classification Search ............... 56/14.3, 56/94, 119, 327.1, 327.2, DIG. 17, DIG. 20, 56/DIG. 24, 17.6, 123, 158, 232, 236, 242, 56/257, 259, 275, 296–301
See application file for complete search history.

(56) References Cited

U.S. PATENT DOCUMENTS 3,260,041 A * 7/1966 McRoberts et al. ........... 56/119
4,000,398 A   12/1976 Conner
4,198,803 A *  4/1980 Quick et al. .................. 56/296
4,540,003 A    9/1985 Osselaere
5,809,759 A *  9/1998 Zyla et al. ..................... 56/298
6,070,401 A *  6/2000 Johnson ....................... 56/257
2003/0199291 A1 10/2003 Bernhardt et al.

FOREIGN PATENT DOCUMENTS

| DE | 199 22 436 A1 | 11/2000 |
|----|----|----|
| DE | 101 50 080 A1 | 1/2003 |
| GB | 1 401 878 | 8/1975 |
| GB | 1 429 706 | 3/1976 |
| GB | 1 450 956 | 9/1976 |
| WO | WO 2004/012494 A1 | 2/2004 |

* cited by examiner

*Primary Examiner*—Thomas B. Will
*Assistant Examiner*—Mai T Nguyen
(74) *Attorney, Agent, or Firm*—Bachman & LaPointe

(57) ABSTRACT

An arrangement for reducing soybean losses in soybean headers, includes a plurality of retainers which may be engaged to a tray edge and each retainer comprises a plate having a substantially planar central portion ending at a lower end which is curved downwardly forming a rounded flange from which a portion providing two grooves is projected, and arranged at a slightly offset angle with respect to the central portion and the upper end of which is folded upwardly at an angle of approximately 45° from the central portion.

9 Claims, 4 Drawing Sheets

Loss decrease per header indicated for the three speeds in kg per hectare.

Percentage decrease of losses in the platform based on a sampling carried out with three speeds used for harvesting.

ARRANGEMENT FOR REDUCING SOYBEAN LOSSES IN SOYBEAN HEADERS

BACKGROUND OF THE INVENTION (1) Field of the Invention

The instant invention relates to an arrangement for reducing soybean losses in soybean headers.

In order to explain the instant invention such that same may be easily carried out, the following paragraphs are a detailed description of a preferred embodiment, with reference to the accompanying drawings, merely as a non limiting example of the invention, the components of which may be selected among several equivalents without departing from the principles of the invention as established in the instant specification.

(2) Prior Art

Various papers issued by the National Institute of Agricultural Technology, from now onwards "INTA", as well as several publications, namely "Soja, siembra, cosecha, secado y almacenaje "(Soybean; seeding, harvesting, drying and storage) (Bragachini, M. et al; 1993; INTA-EEA-Manfredi); "Eficiencia de cosecha de soja y maiz" (Soybean and corn harvesting efficiency" (Bragachini Ml, Peiretti, J; 2004; INTA-EEA-Manfredi) and a manual not still issued, "Soja, eficiencia de cosecha y post cosecha" (Soybean, harvesting and post-harvesting efficiency", by Bragachini, M. et al. registered in the project launched by INTA on the efficiency of harvest and post-harvest of grain have been considered.

Also, a search have been carried out to know possible antecedents of prior art which could constitute an opposable reference. Thus, U.S. Pat. No. 4,000,398 relates to a method used to determine losses during harvest. To this end, an impact sensor is used producing an electrical signal which is measured and related to the harvesting speed for providing a reading of a lost product unit.

WO 2004012494 relates to a control model which is permanently optimized for adapting to the last work conditions. Each parameter is considered as a variable which instantaneously prevails in the reading of the harvesting process. Each variable may be used to establish ground maps showing the harvesting evolution. Also, this device may be used automatically in order to adjust working speed and reduce grain losses.

DE 19922436 comprises a sliding roller manually operated or included into a machine. Meteorological and biological conditions define the moment at which harvest should be urgently effected. This invention allows the farmer to consider a balance between the loss percentage and the increase in the traveling speed.

DE 10150080 describes a control process having automatic verification of the results transversally to the driving direction. It has an electronic system for displaying losses in real time for controlling and calibrating harvesting tools in order to increase efficiency.

Published GB 1450956 relates to a harvesting machine comprising a transducer measuring the grain directly and, at the end, a transducer measuring the grain gathered operating with the same measurement principles. A differential amplifier receives measurements and a proper means indicates whether the loss is within acceptable levels. Two transducers are shown which measure direct loss of grain from the straw walker and a screen indicates the collected grain. The differential amplifier transmits to a dual scale of calibrated scales an acceptable level of lost grain. The amplifier also transmits to a harvest speed control unit.

US 20030199291 describes an apparatus and method for determining lost grain in a harvesting machine. To this end, said harvester has a region of the crop separator with separate members having proximity sensors for generating a signal corresponding to the separated amount. Such signal is sent to an assessment unit for its processing, which includes determining a curve of some of the zones and the conversion of said curve into a measurable feature. The loss is determined by the assessment unit based on the curve characteristics.

Published GB 1429706 relates to an apparatus for measuring the amount of grain lost by a harvester, including a plurality of metal disks insulated from vibrations arranged on supports and separated therebetween by a rubber foam. Each disk provides a metal plate compressing a piezoelectric transducer the main connections of which are engaged to a common conductor.

GB 1401878 allows measuring and controlling grain loss from a straw walker and, to this end, the amount of grain falling through an opening is measured with a sensor engaged to a circuit and fed to an amplifier and/or a straw walker speed controller.

U.S. Pat. No. 4,540,003 includes a lost grain sensor mounted at the side of a rotary thresher such that the grain ejected by the machine enters into the sensor to measure the separated grain just before the straw is disposed off.

The above embodiments are mainly directed to measuring the amount of grain lost during harvest, employing sophisticated meters, counters and electronic equipment.

The cited references are limited to indicate that, under certain conditions, with determined implements and at a determined speed, the loss could be estimated in a determined percentage.

Therefore, these references do not relate to a process for decreasing losses, but to accept such losses under certain conditions.

SUMMARY OF THE INVENTION

The applicant acknowledges that during harvesting of certain extensive crops, the loss is higher than with other crops. This is the case mainly with soybean, wheat, corn, sunflower, sorghum, beans, peanut, cotton and rice.

In our country, 26 million hectares are devoted to these crops, from which 13,8 million, i.e. 53% are devoted to soybean.

As a direct consequence of inefficiency, in Argentina an average of 166 kg/ha are lost, from which 24 kg/ha correspond to the pre-harvest and the rest to the action of the harvester per se.

From the 141 kg/ha lost by the harvesting machine, 78% is as a result of the operation of the machine header, while the remaining 22% is lost as a consequence of threshing, separation and cleaning.

Taking into account the above, considering that soybean is cultivated through a surface of 13,800,000 ha, it is concluded that during each harvesting operation 2,290,000 tons of soybean are lost which, at the present value, are equivalent to US$500,000,000.

The loss of soybean during harvest is related to the plant nature. In fact, the fruit tends to lose grain, this fact being strengthened by the header vibration during harvest.

As an additional matter, soybean is sphere-shaped which facilitates its sliding, therefore when falling on the tray, it rolls and falls on the ground.

During harvest, the plant is subjected to a displacement sideward when the cutting blade pushes it towards the plant separator while the machine is traveling at 7 km/h, the common speed since, if increased, the loss would be higher.

On the other hand, loss of grain caused by the turnstile added to that caused by friction between plants and that of the latter with the header worm takes place when the flexible is in a negative slope, thus causing rolling of the grains and they are lost when falling from the tray.

An arrangement for reducing soybean losses in soybean headers, includes a plurality of retainers which may be engaged to a tray edge and each retainer comprises a plate having a substantially planar central portion ending at a lower end which is curved downwardly forming a rounded flange from which a portion providing two grooves is projected, and arranged at a slightly offset angle with respect to the central portion and the upper end of which is folded upwardly at an angle of approximately 45° from the central portion.

BRIEF DESCRIPTION OF THE DRAWINGS

In the drawings the same references designate the same or equivalent parts.

Figure 1:
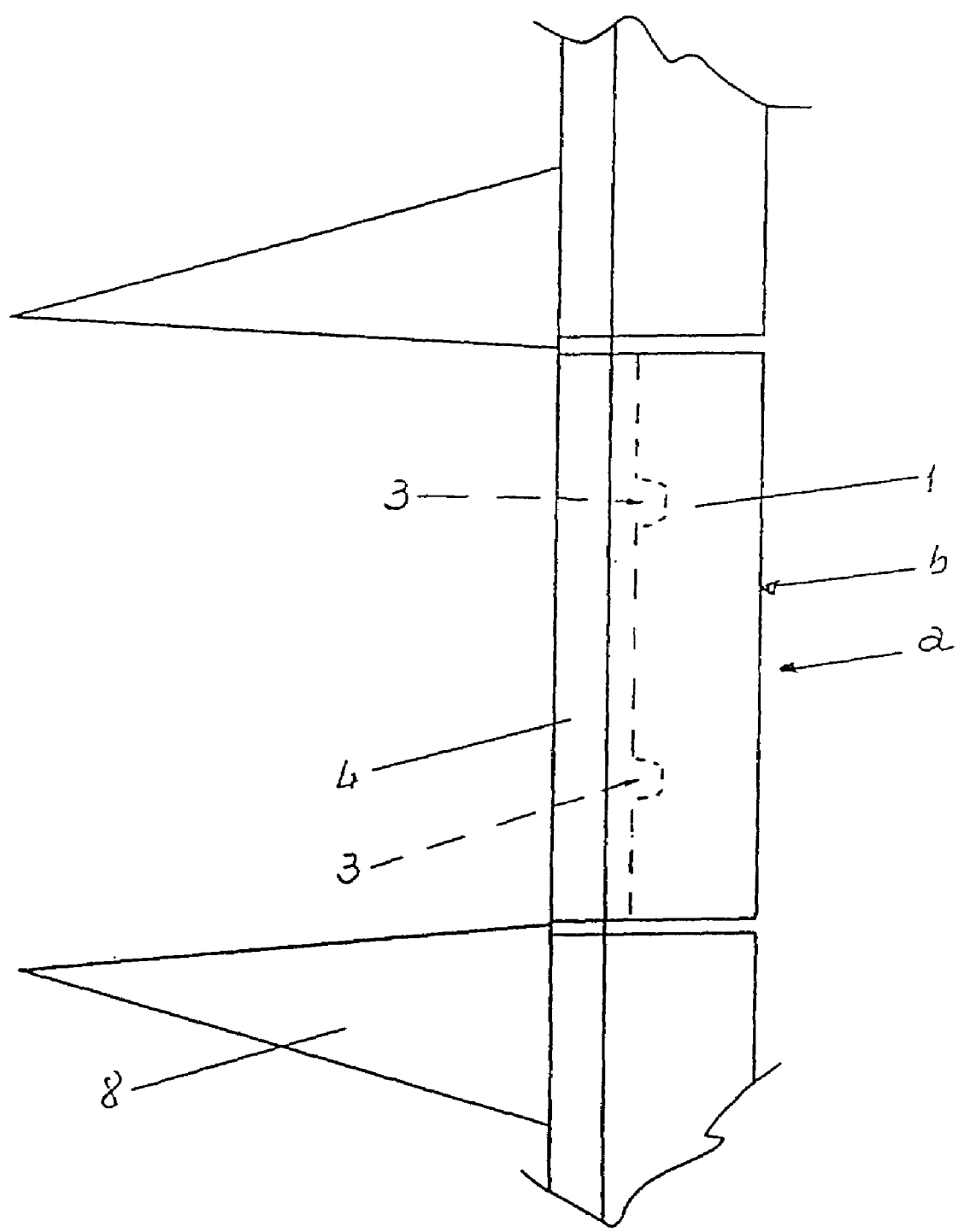
FIG. 1 is a partial schematic upper plan view of a retainer and its location related to a plant separator.
Figure 2:
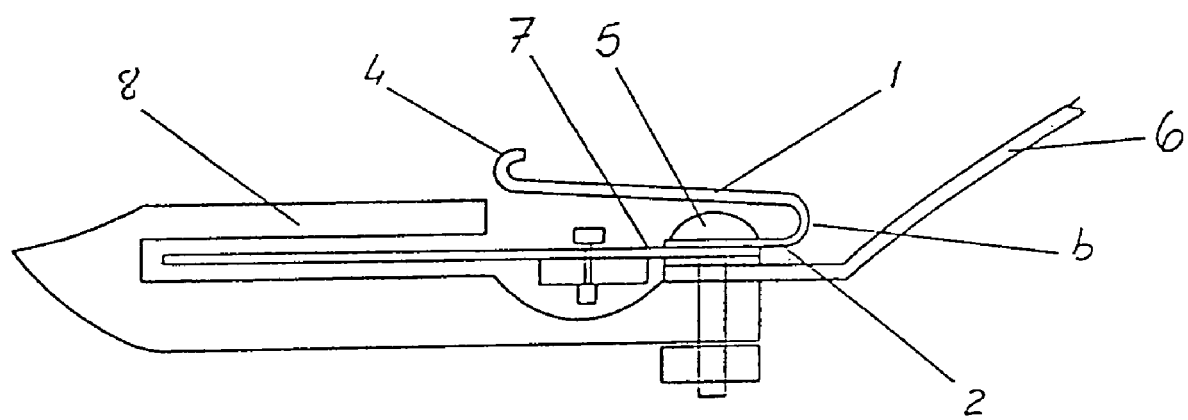
FIG. 2 is a side schematic view showing the position of a retainer with relation to the guide of a cutting blade, a plant separator and the tray.
Figure 3:
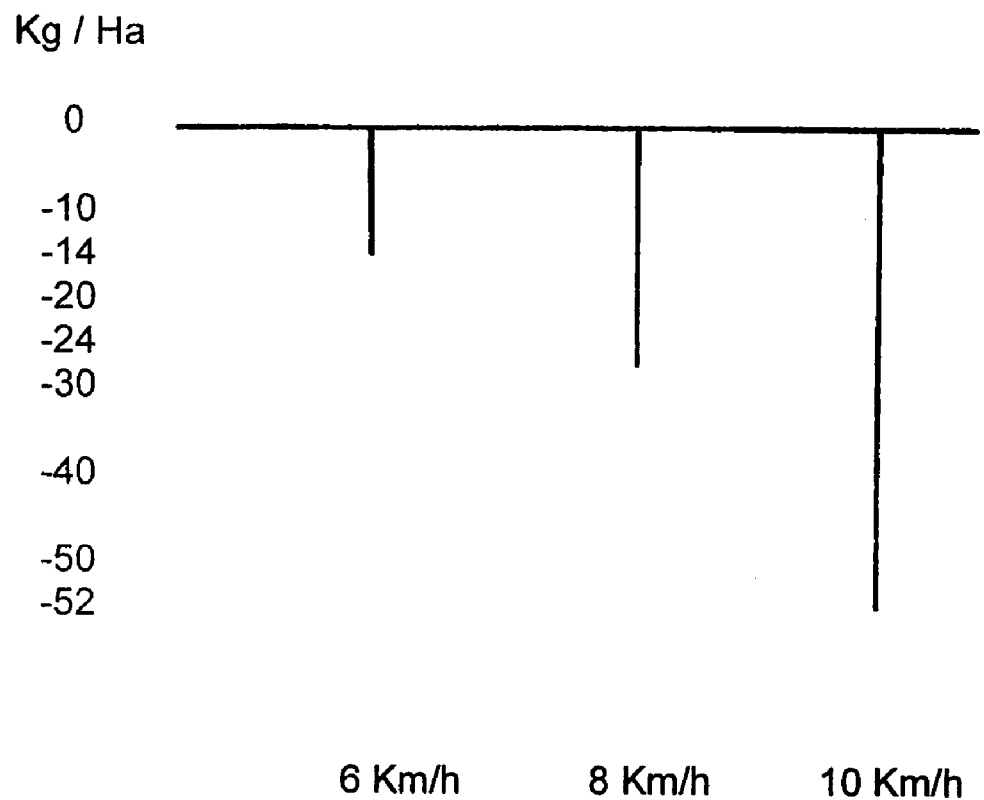
FIG. 3 is a graph showing the percentage decrease of losses in the platform based on a sampling carried out with three speeds used for harvesting.
Figure 3A:
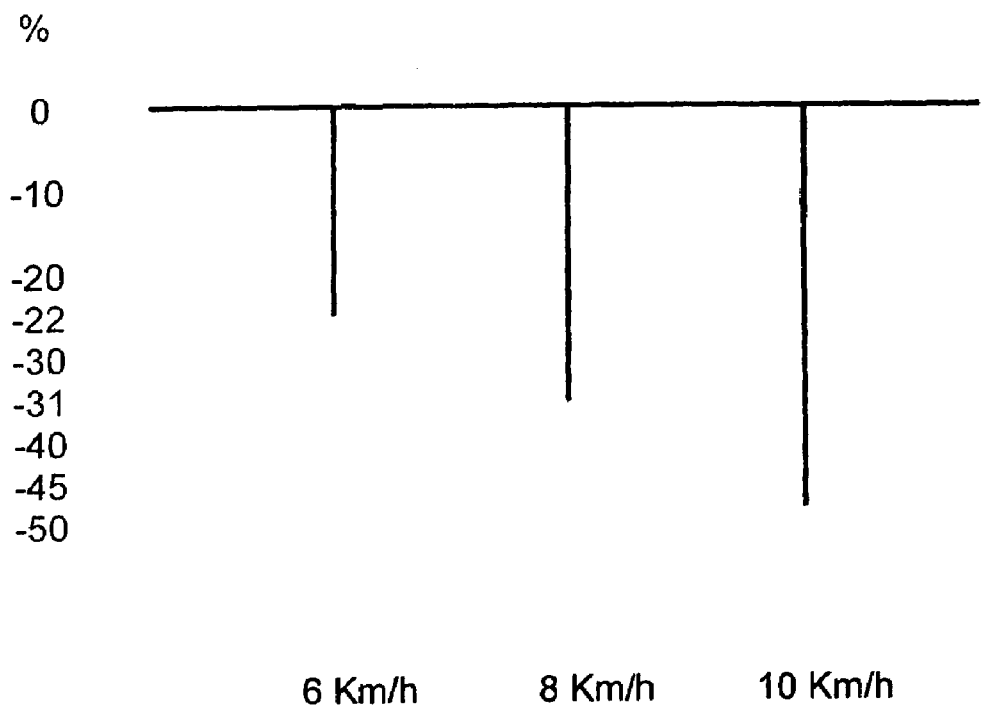
FIG. 3A is a second graph representing loss decrease per header, indicated for the three speeds in kg per hectare.

REFERENCE NOS.

The same references indicate the same or equivalent parts, as follows:
1-central portion
2-lower end
3-groove
4-upper end
5-bolt
6-tray
7-cutting blade guide
8-plant separator

DETAILED DESCRIPTION OF THE INVENTION

The instant invention relates to an arrangement for reducing soybean losses in soybean headers comprised by a plurality of retainers fitting into the bolts which, used for retaining the cutting blade guides, are originally provided in the trays of said soybean headers.

Retainers are mounted in a row such that their round flange is directed towards the machine front and between the projections of each plant separator.

Operation

Upon establishing the different component parts, the invention will be now described on the basis of the functional and operating relationship of the elements and of the results obtained.

In order to attain an arrangement for reducing soybean losses in soybean headers, a plurality of retainers -a- is provided, each retainer being comprised by a plate having a substantially planar central portion -1- ending at a lower end -2- which is curved downwardly forming a rounded flange -b- from which a portion providing two grooves -3- is projected, and located at an angle slightly offset with respect to said central portion -1-.

Retainer -a- is completed with an upper end -4- which is folded upwardly at an angle of about 45° from the central portion -1-.

Retainers -a- are fitted by bolts -5- being originally provided with tray -6- for fixing the cutting blade guides -7- simply sliding the lower end -2- parallel to the end of said tray -6- in order that said bolts -5- enter into the grooves -3-.

Then bolts -5- are tightened in order that the retainers -a- be firmly fastened.

Due to the clearance and the angle each of said lower ends -2- maintains with respect to the central portion -1-, the rounded flange -b- is located on the cutting blade guide -7- and above the plant separators -8-.

Upon forward movement of the harvesting machine, plants are guided between the projections of a plant separator -8- until they abut against the rounded flanges -b- of retainers -a-, moment in which the blades mow the stalk cutting it against the respective plant separator -8-.

This novel construction avoids winnowing of the plant, consequently the sheaths lose a significantly smaller amount of beans than with the mechanisms used so far.

Once mowed, the plants fall on tray -6- the negative angle of which is compensated with the upper end -4- of retainers -a- and consequently soybeans falling from said tray -6- with the conventional methods are now retained against said upper end -4-.

One of the possible step sequences for carrying out the invention has been described, the invention being embraced by the spirit and scope of the accompanying claims.

What is claimed is:

1. An arrangement for reducing soybean losses in soybean headers, said arrangement comprising:
   a plurality of retainers, each of said retainers comprising a plate having a substantially planar central portion ending in a first end and a second end;
   said first end having a downwardly curved portion forming a rounded flange and an additional planar portion attached to said downwardly curved portion;
   said additional planar portion having two grooves;
   said second end being folded upwardly at angle of approximately 45 degrees from said planar central portion and having a substantially c-shaped configuration; and
   a tray; and
   each said retainer being joined to said tray.

2. An arrangement according to claim 1, wherein said tray having a first planar portion and a second portion angled with respect to said first planar portion; and each said retainer is joined to said first planar portion of said tray.

3. An arrangement according to claim 1, wherein said substantially planar central portion is inclined with respect to said addition planar portion.

4. An arrangement according to claim 2, further comprising:
   a plurality of bolts for fixing the positions of said retainers;
   each said bolt having a bolt head; and
   each said groove being located between a respective one of said bolt heads and said first planar portion of said tray.

5. An arrangement according to claim 1, further comprising:
- a plurality of plant separators;
- each said retainer having a front end; and
- said rounded flange having an open portion which faces towards said front end and being located above plant separators.

6. An arrangement according to claim 5, wherein said second end of each retainer has an open end facing away from said front end so as to compensate for a negative angle of said tray.

7. An arrangement according to claim 1, further comprising a cutting blade having an end positioned between said tray and said additional planar portion.

8. An arrangement according to claim 7, further comprising at least one bolt for joining said retainer to said tray and to said cutting blade.

9. An arrangement according to claim 8, further comprising at least one plant separator and said at least one bolt joining said at least one plant separator to said retainer, said tray, and said cutting blade.

* * * * *